(12) United States Patent
Boldizsar

(10) Patent No.: US 10,100,224 B2
(45) Date of Patent: Oct. 16, 2018

(54) AQUEOUS SOLUTION

(71) Applicants: Dagmar Fitz-Kramer, Erkheim (DE); Volker Fritz, Erkeim (DE)

(72) Inventor: Zoltan Boldizsar, Isny (DE)

(73) Assignees: Dagmar Fitz-Kramer, Erkheim (DE); Volker Fritz, Erkheim (DE)

( * ) Notice: Subject to any disclaimer, the term of this patent is extended or adjusted under 35 U.S.C. 154(b) by 179 days.

(21) Appl. No.: 14/357,415

(22) PCT Filed: Oct. 29, 2012

(86) PCT No.: PCT/EP2012/071359
§ 371 (c)(1),
(2) Date: May 9, 2014

(87) PCT Pub. No.: WO2013/068260
PCT Pub. Date: May 16, 2013

(65) Prior Publication Data
US 2014/0322548 A1  Oct. 30, 2014

(30) Foreign Application Priority Data
Nov. 9, 2011  (DE) .................. 10 2011 055 188

(51) Int. Cl.
| | | |
|---|---|---|
| *C09D 189/00* | (2006.01) | |
| *C09D 5/18* | (2006.01) | |
| *C09K 21/06* | (2006.01) | |
| *C09D 1/04* | (2006.01) | |
| *C09D 105/00* | (2006.01) | |
| *D21H 21/34* | (2006.01) | |
| *C08L 89/00* | (2006.01) | |
| *C08L 97/02* | (2006.01) | |
| *B27K 3/15* | (2006.01) | |
| *B27K 3/00* | (2006.01) | |

(52) U.S. Cl.
CPC .......... *C09D 189/00* (2013.01); *C08L 89/00* (2013.01); *C08L 97/02* (2013.01); *C09D 1/04* (2013.01); *C09D 5/18* (2013.01); *C09D 105/00* (2013.01); *C09K 21/06* (2013.01); *D21H 21/34* (2013.01); *B27K 3/002* (2013.01); *B27K 3/15* (2013.01); *Y10T 428/31634* (2015.04)

(58) Field of Classification Search
None
See application file for complete search history.

(56) References Cited

U.S. PATENT DOCUMENTS

| | | | | |
|---|---|---|---|---|
| 2,394,043 | A * | 2/1946 | Davidson ............. | C09J 191/005 106/129.1 |
| 4,533,490 | A * | 8/1985 | Kluth ................... | C04B 24/005 252/62 |
| 5,476,686 | A * | 12/1995 | Fritz ..................... | B27K 3/20 106/137.1 |
| 5,698,191 | A * | 12/1997 | Wiersma ............... | A01N 65/00 106/17 |
| 2005/0203219 | A1* | 9/2005 | Guo ...................... | B05D 7/08 524/17 |
| 2006/0163769 | A1* | 7/2006 | Thole .................... | B27N 9/00 264/115 |
| 2009/0098387 | A1* | 4/2009 | Brady ................... | C09J 189/00 428/425.1 |

FOREIGN PATENT DOCUMENTS

| | | |
|---|---|---|
| DE | 162043 | 7/1905 |
| DE | 29506761 U1 | 12/1996 |
| EP | 2236578 A1 | 10/2010 |
| GB | 362955 | 12/1931 |
| GB | 455533 | 10/1936 |
| RU | 2237631 C2 | 10/2004 |
| WO | 1996033306 | 10/1996 |
| WO | 2010130409 A2 | 11/2010 |

OTHER PUBLICATIONS

Stulz, et al., "Appropriate Building Materials: A Catalogue of Potential Solutions", "Soil Stabilizers", Aug. 1, 1993, vol. 3, Publisher: SKAT, Published in: UK.

* cited by examiner

*Primary Examiner* — Chinessa T. Golden
(74) *Attorney, Agent, or Firm* — William A. Loginov; Loginov & Associates

(57) ABSTRACT

The invention relates to an aqueous solution containing at least one modification agent, whey, water glass and a solvent, in particular an aqueous solvent, and to the uses thereof, particularly as a fire-retardant impregnation, coating or sealant material.

15 Claims, No Drawings

AQUEOUS SOLUTION

The invention relates to an aqueous solution.

In construction using wood, in particular for prefabricated wooden buildings, the combustibility of the building and insulating materials used, i.e., reducing the combustibility, plays a significant role. The building materials used must meet the requirements of applicable standards in order to be usable as building materials or construction elements. Due to the fact that insulation based on wood or cellulose fibers is used in these types of buildings, reducing the combustibility of these insulating materials also plays an important role.

In known approaches, the aim is to reduce the combustibility of the building and insulating materials by adding water glass or whey. A disadvantage in this regard is that on the one hand it cannot be ensured that the building materials or insulating materials are sufficiently wetted or impregnated with the fire-retardant agent, and on the other hand, it is possible that over an extended period of time the applied substances, which sometimes adhere only to the surface of the materials, may come off, so that the fire-retardant effect is lost.

Another disadvantage of known agents for reducing the combustibility is that they have an adhesive effect above a certain concentration. When insulating material, which is generally present in flaked or powdered form, but at least as fibers or the like, is treated with one of the known agents, agglomerations may occur which have an adverse effect on the distribution of the insulating material in the insulation layer. In addition, the agglomerated insulating materials result in disadvantages in the processability of the particular materials and nonuniform combustion behavior.

The object of the present invention is to provide an aqueous solution which overcomes the disadvantages of the prior art and improves the fire protection of building and insulating materials.

For achieving this object, an aqueous solution is proposed which contains at least one modifying agent, whey, water glass, and a solvent. The solvent in particular is a water-containing solvent, preferably water, although the invention is not limited thereto, and encompasses all suitable solvents known to those skilled in the art.

The aqueous solution is not limited to the use of only one modifying agent. In addition, modifying agents having the same function or the same basic chemical structure may be used together. Furthermore, it is possible for different modifying agents to be added to the aqueous solution in combination, depending on the intended purpose and use of the aqueous solution.

It has proven to be advantageous when at least one of the modifying agents used in the aqueous solution is selected from the group comprising saccharides, in particular mono-, di-, tri-, or polysaccharides, preferably sucrose, lactose, lactulose, maltose, or trehalose; alditols; carboxylic acids and their salts and esters; polyhydroxycarboxylic acids and their salts and esters, in particular sugar acid, sugar esters, or combinations thereof.

The group of saccharides includes primarily sugars and starches. The substance group may thus take on multiple functions in the proposed aqueous solution. On the one hand, in the event of fire, the saccharides introduced into the aqueous solution form an insulating protective carbon layer on the impregnated building or insulating materials. On the other hand, the substances are able to bind water and release it over an extended period of time. The stored water may prevent excessively rapid hardening or setting of the aqueous solution which is applied to the insulation or building materials, and may thus extend the open time for the impregnation, thus improving the overall impregnation result.

One or more additional modifying agents, which may be alternatively or additionally added to the aqueous solution, are preferably selected from the group comprising surface-active substances, in particular natural and/or synthetic surfactants, preferably anionic or cationic or amphoteric surfactants, sugar surfactants or alkyl polyglycosides, soaps, emulsifiers, or saponins. When saponins are used, it is regarded as particularly beneficial when these are obtained from Sapindus mukorossi or Quillaja saponaria. Of course, it is also possible to combine one or more of the above-mentioned substances and to use this combination as a modifying agent in the aqueous solution.

Surface-active substances, such as those mentioned above, reduce the surface tension or the interfacial tension between two phases. On the one hand this improves the intermixture of the individual components of the aqueous solution, and on the other hand results in significantly better surface wetting of the building or insulating materials which are treated with the aqueous solution. The impregnation result is thus greatly improved. The correspondingly modified aqueous solution is also able to penetrate into intercellular interstices. The impregnation of the individual building materials or insulating materials is thus further improved, and the combustion behavior is additionally modified. Not only is a surface layer composed of fire protection agent formed on the building or insulating materials, but also the solution providing fire protection penetrates deeply into the treated material and correspondingly wets or coats surfaces there. Likewise, one crucial function, among others, is also provided by the latter-mentioned modifying agents in setting the pH of the aqueous solution used. The alkalinity of the aqueous solution may thus be adjusted, so that the aqueous solution additionally has a fungicidal nature. In addition, attack from insects is minimized, and damage to the building material or the insulating material layer is prevented.

When saponin is selected as the modifying agent, in addition to the surface-active property this substance also provides a further protective function with regard to insects or fungal attacks.

Another embodiment of the aqueous solution which is regarded as advantageous provides that the aqueous solution contains a modifying agent, in addition or as an alternative to those previously mentioned, which is selected from the group comprising binders, in particular cellulose; natural or synthetic wax, preferably plant wax, mineral wax, stearin, or paraffin, natural or synthetic resin, natural or synthetic oil, natural or synthetic wax which is chemically modified, in particular saponified or emulsified in water, natural or synthetic resin which is chemically modified, in particular saponified or emulsified in water, natural or synthetic oil which is chemically modified, in particular saponified or emulsified in water, or combinations thereof. Lastly, viscosity and adhesion properties of the aqueous solution may be set using these types of binders.

In addition, the modifying agent may be selected from beer, casein, thickening agents such as in particular talc, chalk, sawdust, and sand, preferably fine sand or quartz sand, pigments, natural or synthetic rodenticide, insecticide, or fungicide, or combinations thereof as well as combinations with the above-mentioned substances.

The spectrum of uses of the aqueous solution is defined by the addition of one or more coordinated modifying agents. For uses in which coating of surfaces is the most important aspect, it is regarded as beneficial to add a greater proportion of binder. It is also possible to form a paint or a casting or sealing compound from the aqueous solution. In this form of use, particular emphasis is placed on a higher viscosity of the aqueous solution and a clearly defined setting characteristic. This type of use as a modifying agent will then preferably have a higher proportion of binder or thickening agent than, for example, impregnating solutions which are provided for spraying or misting and which penetrate into the structure of the treated material.

When pigments are admixed with the modifying agent, the treated material may be colored by means of the aqueous solution. The use of additional rodenticides, insecticides, or fungicides or combinations thereof increases the pest resistance of the treated materials.

The aqueous solution according to the invention provides for the use of whey. In this regard, it has proven to be particularly advantageous when the whey is selected from the group comprising sweet whey and acid whey. The invention likewise encompasses the possibility of using combinations of the two known types of whey. In the event of fire, the whey components present in the aqueous solution likewise form an insulating protective carbon layer and split off noncombustible gases. A protective gas atmosphere develops which hinders the supply of oxygen to the combustible building or insulating material and thus delays combustion. The above-mentioned types of whey differ primarily in their content of fat and lactose. The fat content of the acid whey is lower than that of the sweet whey, while the lactose content in the acid whey is significantly higher than in the sweet whey. In conjunction with the use of additional saccharides such as sugars, the fire protection effect is thus further enhanced by the addition of whey to the aqueous solution according to the invention.

Another component of the aqueous solution according to the invention is water glass, which is preferably selected from the group comprising sodium water glass and potassium water glass. Of course, it is also possible here to use combinations of sodium water glass and potassium water glass. In addition to the function as a binder, the water glass takes on an important function as a flame retardant agent. The combustion behavior of building and insulating materials as well as buildings formed from same which are treated with the aqueous solution according to the invention may be significantly reduced by treatment with water glass. In general, any type of water glass may be used in the aqueous solution according to the invention; it has proven to be preferable and particularly beneficial when the water glass is sodium water glass, in particular sodium water glass 37/40 Bé.

One preferred embodiment of the aqueous solution provides that the aqueous solution has the following composition: the preferred aqueous solution contains between 0.5 and 10% by volume, in particular between 0.75 and 5% by volume, preferably between 0.95 and 1.25% by volume, of at least one saccharide, in particular lactose. In addition, the aqueous solution contains between 0.1 and 5% by volume, in particular between 0.25 and 3% by volume, preferably between 0.5 and 1% by volume, of at least one whey or type of whey, preferably acid whey.

The aqueous solution also contains at least one surface-active substance, in particular saponin. The proportion in percent by volume is between 0 and 0.5% by volume, in particular between 0.001 and 0.1% by volume, preferably between 0.002 and 0.05% by volume. The aqueous solution also contains between 10 and 85% by volume, in particular between 45 and 75% by volume, preferably between 50 and 70% by volume, of at least one water glass, preferably sodium water glass.

Depending on the intended use of the aqueous solution or the type of insulation or building material to be treated, the aqueous solution, as described above, may preferably contain 0 to 50% by volume of at least one additional modifying agent as described above. Binders, thickening agents, beer, casein, and pigments or pest control agents or pest prevention agents are suitable as additional modifying agents.

As stated above, the aqueous solution contains between 0 and 0.5% by volume, in particular between 0.001 and 0.1% by volume, preferably between 0.02 and 0.05% by volume, of at least one surface-active substance. The surface-active substance may be provided as a dilution from a stock solution with water. As an alternative to dilution with water, it is of course possible to use some other solvent here which appears suitable. The dilution of the stock solution with water or the solvent is carried out in a ratio of between 1:2000 and 1:100, in particular between 1:1500 and 1:200, preferably between 1:1000 and 1:300. The interface activity of the corresponding substances is still present even at lower dilutions. Sufficient wetting of all surfaces of the material to be treated, i.e., the building material or insulating material, is thus ensured. The foaming tendency of the aqueous solution may also be controlled and adjusted by the selection of a suitable dilution.

The invention also encompasses the use of the aqueous solution as described above as a flame-retardant impregnating or coating agent. In this regard, in particular a lignocellulose-based building material is impregnated or coated.

Due to the aqueous consistency of the solution, the solution is particularly suitable for impregnating building materials such as solid wood as well as insulating materials and insulation board, which likewise fall under the term "building materials," for example by pressure impregnation. The surface-active substance(s), which is/are preferably admixed with the aqueous solution as modifying agent, result(s) in good wetting of the building material as well as the internal building material structure. As the result of reducing the surface tension of the aqueous solution, it is able to penetrate deeply into the wood structure or the cellular structure of the solid wood, where it ensures thorough impregnation of the external and internal surfaces of the building material. In addition, natural fiberboard may also be impregnated or coated with the aqueous solution. This type of natural fiberboard consists in particular of panels made of compressed wood fibers, flax fibers, cereal fibers, coconut fibers, sisal fibers, reed fibers, hemp fibers, or palm fibers, as well as panels made from mixtures of the above-mentioned fibers. Here as well, use of the aqueous solution has proven to be advantageous, since impregnation or coating of the fiber components or their sheathing with the flame-retardant substances which penetrates thoroughly and deeply into the structure of the individual fibers is possible.

Furthermore, it is of course also possible that, in addition to impregnation or penetration of the individual fibers, coating or penetration of the finished natural fiberboard with the aqueous solution is carried out, so that the combustion tendency of the natural fiberboard, the same as for the above-mentioned solid wood, is significantly reduced. Due to the aqueous solution according to the invention, in addition to the improved coating or impregnation performance, long-lasting impregnation is provided which not only remains on the surface of the building material, but also penetrates into its structure. In addition to the above-mentioned uses, the aqueous solution is of course also suitable for use as a flame-retardant impregnating or coating agent for panels made of wool. Furthermore, use with wood wool panels may likewise be carried out, as well as impregnation or coating of laminated wood, glued wood, MDF, HDF, OSB, particle board, plywood, and veneer plywood, or buildings made of same. Here as well, not only surface coating of the mentioned building materials, but also deep impregnation of the internal structures of the particular building materials or building material components takes place. The impregnation may be carried out using any process known to those skilled in the art, such as pressure impregnation.

Another use of the aqueous solution is provided in which the aqueous solution is used as a flame-retardant impregnating or coating agent for an insulating material. Insulating materials of this type are generally loose materials which are introducible, in particular blowable, into interspaces or cavities in the building structures to be insulated. The insulating material which is provided for use with the aqueous solution as a flame-retardant impregnating or coating agent, is designed in particular as a lignocellulose-based insulating material; however, the invention is not limited thereto, and encompasses all insulating materials such as those based on stone or plastic. This type of insulating material is produced from wood, for example. The use of the aqueous solution with wood chips or wood fibers is provided. The wood chips or wood fibers are wetted with the aqueous solution, and in the process impregnate the insulating materials. Here as well, the impregnation or coating not only remains on the insulating material surface, but also penetrates deeply into the structure of the insulating materials. Wood chips or wood fibers are, for example, saturated or sprayed with the aqueous solution, and the internal surfaces of the chips or fibers are also thus coated or wetted. The substances of the aqueous solution are embedded or applied as a layer in particular in the cellular interstices. The combustion rate is thus significantly decreased, and the combustion tendency is reduced. In addition to the above-mentioned insulating materials based on wood, wood chips, or wood fibers, it is of course also possible to use the aqueous solution as a flame-retardant impregnating or coating agent with other insulating materials. For this purpose, these insulating materials may be selected, for example, from the group comprising flax fibers, cereal fibers, coconut fibers, sisal fibers, reed fibers, hemp fibers, palm fibers, or mixtures of the above-mentioned types of fibers, as well as mixtures of the mentioned types of fibers with wood, wood chips, or wood fibers. Grass, cereals, or cellulose as well as cellulose fibers and recycled paper and combinations thereof with the above-mentioned materials are suitable as another possible insulating material. These materials as well may be impregnated or saturated with the flame-retardant impregnating or coating agent which is based on the aqueous solution, resulting in optimal fire protection. In addition to the above-mentioned plant-based insulating materials, the aqueous solution may of course also be used as a flame-retardant impregnating or coating agent for animal or synthetic insulating materials, in particular wool. Use with a combination of various insulating materials is also conceivable.

To ensure satisfactory wetting, impregnation, and penetration of the insulating materials or building materials with the aqueous solution, it is provided according to the invention that the aqueous solution is present as a sprayable or atomizable solution. This property of the solution may be provided by suitable selection of the ingredients or substances combined in the aqueous solution. In particular for the treatment of insulating materials, it has proven to be advantageous when the aqueous solution is sprayed onto the materials, which are introduced into a mixing chamber or a mixing vat, for example. Of course, it is also possible to atomize the aqueous solution in a chamber in which the insulating materials are circulated. In any case, the aqueous solution according to the invention ensures thorough impregnation and coating of the insulating material, so that full use may be made of the excellent fire protection properties of the aqueous solution, the combustion tendency of the insulating materials may be significantly reduced compared to untreated insulating materials, and the combustion and self-extinguishing properties are enhanced. Another advantage of the use of the aqueous solution according to the invention is that, due to the penetration and structurally deep impregnation, there is no risk of peeling or cracking of the coating materials from the surface of the impregnated materials, for example in the installed state or in the event of temperature fluctuations and the accompanying changes in volume of the treated materials, and the resulting loss of fire protection of the insulating material.

When the aqueous solution is provided as a sprayable or atomizable solution, the droplets present in the sprayed or atomized solution preferably have an average diameter of between 10 μm and 50 μm, in particular between 20 μm and 45 μm, preferably between 20 μm and 40 μm. Corresponding droplet sizes may be set by suitable selection of the surface-active substance(s) in the aqueous solution and by suitable percentage by volume proportions of the water glass.

It is regarded as advantageous when the proportion of water glass in the aqueous solution, when the aqueous solution is provided for use as a flame-retardant impregnating or coating agent for an insulating material, is between 10% by volume and 70% by volume, preferably between 30% by volume and 67% by volume. This results in a particularly advantageous proportion of water glass which on the one hand ensures the fire protection performance of the aqueous solution according to the invention, and on the other hand does not adversely affect its spraying or atomizing capability. It is likewise regarded as advantageous when the aqueous solution has a viscosity between 1 and 3 mPa·s at room temperature.

The invention further encompasses the use of the aqueous solution as stated above as a flame-retardant, spreadable application solution for a building material. In the mentioned use, the aqueous solution contains a higher proportion of at least one binder or thickening agent which is added to the base formulation as an additional modifying agent. In contrast to the above-described impregnating solution, this results in a more viscous application solution which is used as a paint or as an impregnation coating. The building material which is treatable with the spreadable application solution is in particular solid wood. In contrast to a strictly impregnating solution, with the additional use of the aqueous solution a surface coating or sealing function is also provided here. That is, the aqueous solution penetrates into the building material and impregnates it, but a portion remains on the surface and provides surface coating or sealing at that location. In addition to the solid wood mentioned above as a building material, it is of course also possible to apply the aqueous solution, in its use as a flame-retardant, spreadable application solution, to natural fiberboard. This type of natural fiberboard may be made, for example, of compressed wood fibers, flax fibers, cereal fibers, coconut fibers, sisal fibers, reed fibers, hemp fibers, palm fibers, or fiber mixtures. It is also possible to produce this type of natural fiberboard from wool or a wool admixture. The aqueous solution is also suitable as a flame-retardant, spreadable application solution on wood wool panels, laminated wood, glued wood, MDF, HDF, OSB, particle board, plywood, or veneer plywood, as well as buildings made with the above-mentioned materials. Due to the composition according to the invention, in addition to sealing or coating the surface, the spreadable application solution is able to penetrate into the structure of the building materials and provide the internal structures of the building materials with the flame-retardant impregnation here.

To produce the spreadable, flame-retardant application solution from the aqueous solution according to the invention, the at least one modifying agent which is usable in the aqueous solution is preferably selected from the group comprising binders, thickening agents, talc, chalk, sawdust, or sand, particular preferably fine sand or quartz sand. In particular cellulose, which is added to the aqueous solution in powdered or fibrous form, is suitable as a binder. It is also possible to use natural or synthetic wax, preferably plant wax, mineral wax, stearin, or paraffin, as a modifying agent. Natural or synthetic resin may likewise be used as a binder or modifying agent, and further improves the spreadability of the application solution. Alternatively or additionally, natural or synthetic oil may be added. Of course, it is also possible to use the above-mentioned waxes, resins, or oils in chemically modified, in particular saponified, form. Furthermore, it is possible for the above-mentioned waxes, oils, or resins to be present in water or a solvent in emulsified form, and to add such an emulsion to the aqueous solution as a modifying agent. The quality of the spreadable application solution and its durability on the surface of the mentioned building materials is also improved by adding beer and/or casein to the aqueous solution. The adhesion of the paint may be favorably influenced and enhanced in this way.

The proportion of the mentioned modifying agents, stated in particular in claim 4, in the aqueous solution is in particular between 0 and 50% by volume, preferably between 5 and 45% by volume, between 10 and 40% by volume, between 15 and 35% by volume, and/or between 20 and 30% by volume. The proportion is a function of the coating result that is sought, the modifying agents used, and the viscosity of the aqueous solution to be set.

In the latter-mentioned use, it is also possible for the aqueous solution to have a portion of a surface-active substance composed of modifying agent. The addition of saponin is particularly preferred. The proportion of the latter-mentioned modifying agent is in particular between 0 and 0.5% by volume, preferably between 0.001 and 0.01% by volume. To provide a spreadable application solution, it is regarded as advantageous when the aqueous solution has a viscosity between 10 and $10^{14}$ mPa·s, in particular between 3 and $10^{10}$ mPa·s, preferably between 4 and $10^{12}$ mPa·s, at room temperature.

The selection of the solvent used is crucial for the quality and the characteristic of the application. When a high-volatility solvent is used here, the paint cures more rapidly than when water is used. Thus, by the selection of the solvent, the impregnating and coating performance of the aqueous solution when used as a flame-retardant, spreadable application solution may be influenced, and the open processing time may be adjusted or coordinated with the particular building material.

Another use of the aqueous solution according to the invention provides that the aqueous solution is used as a flame-retardant adhesive or binder for a building material which may be made of compressed lignocellulose fibers or animal and/or synthetic fibers, in particular wool. For this purpose, the lignocellulose fibers or animal fibers are mixed, or coated or impregnated, with the aqueous solution in advance and subsequently compressed into panel-shaped building material, or are treated with the aqueous solution after the compression. The use is not limited to the formation of panel-shaped building materials, and of course it is also possible to produce building materials which are beam-shaped or which have other geometries from the mentioned fibers.

The lignocellulose fibers which are usable in the above-mentioned use of the aqueous solution are selected in particular from the group comprising wood chips, wood fibers, wood pulp, flax fibers, cereal fibers, coconut fibers, sisal fibers, reed fibers, hemp fibers, palm fibers, or mixtures of the mentioned types of fibers. The sizing and further preparation of the fibers depends on the intended use of the building material, and may be carried out in a suitable manner known to those skilled in the art. In addition to the use of the above-mentioned lignocellulose fibers, it is also possible here to use grass, cereals, cellulose or cellulose fibers, or appropriately processed recycled paper, and combinations thereof.

To achieve satisfactory bonding of the compressed lignocellulose fibers or animal fibers and to favorably influence the combustion behavior, it is provided that in the above-mentioned use of the aqueous solution as a flame-retardant adhesive or binder, the proportion of water glass is between 10 and 80% by volume, preferably between 30 and 70% by volume. Such water glass proportions result in greater adhesive power of the aqueous solution, and thus favorably influence the bonding of the fibers. To ensure optimal wetting of the fibers, it is provided that the proportion of the at least one surface-active substance which is added to the aqueous solution as a modifying agent is between 0 and 0.05% by volume, in particular between 0.001 and 0.01% by volume. The use of saponins as a surface-active substance has proven to be particularly suitable. However, the use according to the invention is not limited thereto, and encompasses further surface-active substances, preferably surfactants, in particular the substances stated in claim 3, and mixtures thereof.

Another use of the aqueous solution provides that the aqueous solution is used as a preventive fire protection agent, in particular as a forest fire or wildfire protection agent. For this purpose, the aqueous solution is produced as a sprayable or atomizable solution, and is preventively sprayed or misted as a forest fire or wildfire protection agent on non-burning forest areas or combustible areas. The aqueous solution forms a film which wets all plant parts and thus significantly reduces their combustion tendency. The forest fire or wildfire protection agent has no adverse effects on plants. Rather, the composition according to the invention of the aqueous solution results in a fertilizing effect which favorably influences the resistivity of the plants. In the above-mentioned use of the aqueous solution as a forest fire or wildfire protection agent or preventive fire protection agent, the aqueous solution may be sprayed in a band pattern, for example, on the plants and surfaces present in front of a fire source, which prevents the fire from spreading to the correspondingly treated areas, or delays combustion at that location. In this regard, it has proven to be advantageous when the sprayed or atomized solution has droplets with an average diameter between 10 and 50 μm, in particular between 20 and 45 μm, preferably between 20 and 40 μm. The proportion of water glass in the aqueous solution is advantageously between 10 and 70% by volume, preferably between 30 and 67% by volume, and the aqueous solution advantageously has a viscosity between 1 and 3 mPa·s at room temperature.

Another use of the aqueous solution according to the invention provides that the aqueous solution is provided as a casting or sealing compound. This casting or sealing compound is preferably suited for sealing off penetration into buildings, walls, or ceilings in building structures or the like in a flame-resistant or air-tight manner. Such penetration is particularly important in the spreading of fires, either into the intermediate layers in multi-layer buildings or from the outside into the interior of buildings. In this case it is particularly important to provide an air-tight and fire-resistant seal. The proposed aqueous solution is particularly suited for this purpose due to the flame-retardant properties. To ensure the capacity for casting, spraying, or pouring the aqueous solution as well as sufficient adhesion in the various above-mentioned penetrations, the aqueous solution in particular has a binder, thickening agent, or adhesive as a modifying agent. This type of binder may be added to the aqueous solution in the form of cellulose, natural or synthetic waxes, oils, or resins, for example. Furthermore, talc, chalk, or sawdust are particularly suitable as a thickening agent, for example. In addition, sand, preferably fine sand or quartz sand, is a modifying agent which may be added to the aqueous solution to provide a casting or sealing compound which on the one hand forms an adequate seal even against wall penetration, and on the other hand has sufficient adhesion.

In the use of the above-mentioned modifying agents, it is of course also possible to add to the aqueous solution natural or synthetic wax, preferably plant wax, mineral wax, stearin or paraffin, natural or synthetic resin, natural or synthetic oil, as well as waxes, oils, or resins which are chemically modified, in particular saponified or emulsified in water, on the one hand in order to influence the setting and binding behavior of the aqueous solution when used as a casting or sealing compound, and on the other hand to ensure sufficient fire protection.

Furthermore, the invention encompasses a building material having impregnation or wetting based on the aqueous solution described above. In contrast to a surface coating or paint, the impregnation or wetting is characterized in that the internal structure of the treated building material is also coated or wetted with the aqueous solution. The fire protection is thus ensured even in the deeper structural layers of the building material, and the combustion behavior or the fire resistance of the building material is thus crucially influenced and improved. The building material having the impregnation or wetting is preferably selected from the group comprising solid wood, natural fiberboard, in particular natural fiberboard made of compressed wood, flax cereal, coconut, sisal, reed, hemp, or palm fibers, panels made of wool or panels made of fiber mixtures, as well as wood wool panels, laminated wood, glued wood, MDF, HDF, OSB, particle board, plywood and/or veneer plywood. The building material according to the invention is advantageously characterized in that the impregnation or wetting penetrates or is introduced into the surface of the building material and also into the surface of the substances or fibers which form the building material. This type of impregnation on the one hand may take place by surface coating of the building materials, or on the other hand a pressure impregnation process may be used for introducing the impregnation or wetting. The impregnation or wetting may also be applied or introduced by spraying, misting, or spreading onto or into the surface. The invention thus encompasses building materials which have impregnation or wetting that is applied using any process known to those skilled in the art.

It is provided that the proportion of impregnation or wetting, based on the total mass of the building material, is between 0.5 and 30%, in particular between 2 and 15%, preferably between 5 and 10%. The total mass of the building material is increased due to the applied or introduced aqueous solution, since after the solvent evaporates, the constituents of the aqueous solution dissolved in the solvent remain in the building material and thus increase its total mass. The proportion of impregnation or wetting based on the total mass of the building material may therefore vary in the different stages of the impregnation.

In addition, the invention encompasses an insulating material which has impregnation or wetting which is based on the aqueous solution as described above. The insulating material is characterized in that the aqueous solution or its components have penetrated into the structure of the insulating material, resulting in extensive wetting or coating of all surfaces of the insulating material. The improved impregnation or wetting results from the composition according to the invention of the aqueous solution. Due to a reduced interfacial tension or breaking up of the interfacial tension in the aqueous solution, the aqueous solution may also penetrate into the surface structures of the insulating materials. Accumulation in the cellular interstices is likewise possible. As a result, the fire resistance may be increased, and the ignition or combustion rate may be decreased. During combustion, due to the constituents of the aqueous solution a carbon layer forms on all surfaces of the insulating materials or the building materials that are impregnated or treated with the aqueous solution. This carbon layer on the one hand excludes oxygen, making further combustion difficult, and on the other hand releases gases which prevent or hinder further combustion of the insulating materials or building materials. In addition, early self-extinguishing of the material is facilitated.

The insulating material which is impregnated or wetted with the aqueous solution and proposed according to the invention is selected in particular from the group comprising lignocellulose-based insulating material, animal insulating material, or combinations thereof. This type of insulating material may be made of wood, wood chips, or wood fibers, for example. Wood chips in particular are very well suited as insulating material, and on the one hand form a sufficiently large surface for satisfactory impregnation or wetting with the aqueous solution, and on the other hand, due to the chip structure the aqueous solution is able to penetrate into the structure of the wood chips, where it ensures complete impregnation or wetting of all surfaces. The impregnated wood chips may be blown or filled into the interspaces provided for introducing insulating material, or may be introduced in some other way. The flame-retardant impregnation or wetting results in delayed combustion of the insulation layer. As a result of the composition of the aqueous solution according to the invention, no sticking or clumping of the insulating materials occurs. In addition to the use of insulating materials based on wood, wood chips, or wood fiber, it is also possible to use flax fibers, cereal fibers, coconut fibers, sisal fibers, reed fibers, hemp fibers, palm fibers, or mixtures of these fibers, and also to use the fibers and wood chips. Alternatively or additionally, grass or cereals which have been appropriately impregnated or wetted may be used as insulating material. Cellulose, cellulose fibers, or (processed) recycled paper is used as a further insulating material or as an admixture to form an insulating material. These materials are also impregnated or wetted with the aqueous solution, and are thus activated to be fire-resistant. Animal insulating materials, in particular wool, may be used as insulating material having the impregnation or wetting based on the aqueous solution according to the invention. It is likewise possible to use combinations of the above-mentioned plant and animal fibers as insulating material, or to use synthetic insulating materials alone or in admixture. The impregnation or wetting may be provided on the fiber mixture or insulating material mixture. Alternatively, it is also possible to separately impregnate or wet all components of the fiber mixture or insulating material mixture, since under some circumstances different impregnation or wetting processes, times, or intensities may be indicated. For forming the end-use insulating materials, the impregnated or wetted materials may then be combined and introduced into the insulating material layer.

It is regarded as advantageous when the impregnation or wetting is introduced into the surface of the insulating material. In addition, it is of course also possible, and encompassed by the invention, for the substance or the fibers which form(s) the insulating material to be penetrated by the aqueous solution. Depending on the insulating material selected, it is regarded as beneficial when the impregnation or wetting is introduced into the insulating material by spraying, atomizing, or in a pressure impregnation process, or applied or introduced onto its surface. In addition to the above-mentioned types of impregnation or wetting, it is of course also possible to dip the insulating material into an appropriate aqueous solution. The insulating material is penetrated by the aqueous solution. The solvent fractions evaporate, and the dissolved components remain in the insulating material and impart the fire resistance and impair the combustion behavior. For the impregnation or wetting, the relative humidity of the insulating material is temporarily increased. After the solvent has evaporated, the relative humidity of the impregnated insulating material preferably corresponds to that of the non-impregnated insulating material. The proportion of the impregnation or wetting based on the total mass of the insulating material is 1 to 30%, in particular 2 to 15%, preferably 3 to 10%. The proportion of the impregnation or wetting based on the total mass of the insulating material is determined in the dry state, i.e., in the dry state after the impregnation. The relative humidity of the insulating material is increased during the impregnation or wetting, since the insulating material is brought into contact with the aqueous solution. After the impregnation or wetting is completed, the insulating material is dried to the original starting humidity of the non-impregnated insulating material.

The invention likewise encompasses a building material made of lignocellulose fibers or animal fibers, in particular wool, in which the aqueous solution as described above is used as a flame-retardant adhesive or binder. The fibers used for producing the building material are selected in particular from the group comprising wood chips, wood fibers, wood pulp, flax fibers, cereal fibers, coconut fibers, sisal fibers, reed fibers, hemp fibers, palm fibers, or mixtures of these fibers and types of fibers. In addition, it is possible to use grass, cereals, or also cellulose, cellulose fibers, or recycled paper or appropriately processed recycled paper or combinations thereof in the building material. The fibers of animal or plant origin are wetted, combined, or impregnated with the aqueous solution which is usable as a flame-retardant adhesive or binder, and subsequently shaped into the desired form of building material, for example compressed or formed into panels, beams, or some other shape. Alternatively, of course, it is also possible to initially form the building material into the basic shape from the fibers or fiber mixtures, for example by compression or some other type of shaping, and to introduce the aqueous solution afterwards. The aqueous solution penetrates the building material blank that is formed, and on the one hand results in flame-retardant impregnation of the building material, and on the other hand results in bonding and crosslinking, adhesive bonding, and/or permanent joining of the fiber components.

The proportion of the adhesive or binder, based on the total mass of the building material, is preferably 0.5 to 50%, in particular 1 to 30%, preferably 2 to 25%. The hardness of the building material may also be set by adjusting the proportion of adhesive or binder based on the total mass. Furthermore, the building material may be further adapted to various intended uses by selecting suitable modifying agents. In addition to the flame-retardant substances in the aqueous solution, for example the whey and the water glass as well as a modifying agent selected from the group of saccharides, it is possible to add chalk, talc, or sand, for example, which further improve the hardness and the setting behavior of the building material or adapt it to an appropriate intended use. In addition to the flame-retardant impregnation or wetting, a water-repellent function of the building material may be provided by adding suitable resins, oils, or waxes. When pigments are added to the aqueous solution, in addition to fire protection, coloring may also be achieved by means of the adhesive or binder.

The invention likewise encompasses a building material having a paint which is formed from the aqueous solution as described above. For this purpose, the aqueous solution is appropriately modified by admixing binders or thickening agents as modifying agent, so that surface coating or sealing may be provided in addition to impregnation. The building material provided with the paint, or a building or a building part made therefrom, is preferably selected from the group comprising solid wood, (wood) boards, (wood) panels, (wood) sheets, (wood) veneers, and (wood) beams. In addition, natural fiberboard, in particular made of wood fibers, flax fibers, cereal fibers, coconut fibers, sisal fibers, reed fibers, hemp fibers, palm fibers, or natural fiberboard produced from fiber mixtures, or natural fiberboard made of wool or having a wool admixture, may also be used as a building material. It is likewise possible to apply the paint to a building material, building, or building part made of wood wool panels, laminated wood, laminated wood panels, glued wood, glued wood panels, glue-laminate beams, MDF, HDF, OSB, particle board, plywood, and veneer plywood, veneer, or veneer panels. According to the invention, it is provided that the aqueous solution results not only in a surface paint, surface coating, or surface sealing of the building material, but also in penetration of the aqueous solution into the structure of the building material, so that impregnation takes place in addition to the surface sealing. Of course, by suitable selection of the admixed modifying agents, this type of impregnation may be specifically prevented so that the paint remains only on the surface of the building material. The paint then forms a closed coating here and seals the building material. In the event of fire, due to the paint a flame-retardant carbon layer initially forms which excludes atmospheric oxygen from the building material thereunder, thus significantly improving the natural combustion behavior of wood.

In addition to the paint on the individual building materials mentioned above, it is of course also possible that the building material provided according to the invention is an installed building material, and the paint is thus applied to a building or building part made of the above-mentioned building materials. One embodiment that is regarded as advantageous provides that the paint is colorless or semi-transparent, or contains a paint pigment admixture. Another preferred embodiment provides that the paint seals the surface of building material in a water-tight manner.

EXEMPLARY EMBODIMENTS

The invention is illustrated below with reference to examples. The exemplary embodiments shown are used solely to explain the invention; however, the invention is not limited to the embodiments described in the exemplary embodiments.

Example 1: Preparation of an Aqueous Solution with Fresh Sweet Whey and Water Glass To test the extent to which an impregnating solution based on whey components and water glass may be prepared, 0.5 L fresh sweet whey was mixed with 0.5 L sodium water glass dissolved in water.

The aqueous solution prepared in this way tends to agglomerate, and therefore is not suitable as an impregnating or wetting solution or for misting or spraying, since due to the agglomerations in the aqueous solution there is concern for plugging of the spray or atomizing nozzles.

Example 2: Preparation of an Aqueous Solution Composed of Sweet Whey, Lactose, and Water Glass Another aqueous solution was prepared in which, in addition to the substances used in Example 1, namely, sweet whey and water glass, lactose was also admixed. A total of 0.5 L fresh liquid sweet whey, 250 mL lactose dissolved in water, and 250 mL sodium water glass dissolved in water were added.

This aqueous solution also tended toward flocculation. In addition, the prepared aqueous solution was very sticky due to the lactose component. Therefore, the aqueous solution is not suitable as an impregnating or coating agent, and in particular is not suitable for atomizing and misting. There is a strong tendency toward nozzle plugging due to the very sticky consistency and the resulting flocculate in the solution.

Example 3: Preparation of an Aqueous Solution Composed of Sweet Whey, Acid Whey, and Water Glass In another test setup, the influence of the type of whey used on the aqueous solution was tested. 250 mL fresh sweet whey was mixed with 250 mL fresh acid whey, and 500 mL sodium water glass dissolved in water was added.

The aqueous solution prepared in this way also tended toward flocculation, and was too sticky overall for satisfactory atomizing or misting. The water glass precipitated due to the change in pH as a result of the acid whey used. The solution prepared in Example 3 also proved to be flocculent and too sticky for misting or impregnation.

Example 4: Preparation of an Aqueous Solution Composed of Sweet Whey, Lactose, Water, and Water Glass For an additional test solution, 250 mL of sweet whey prepared from powder was mixed with 250 mL lactose dissolved in water and 300 mL sodium water glass dissolved in water, and an additional 200 mL water was added for dilution. The solution that was formed showed no flocculation, but was too sticky for use as an impregnating solution and did not exhibit satisfactory impregnation performance. Here as well, there was concern for plugging of the nozzles provided for the atomization.

All aqueous solutions mentioned in Examples 1 through 4 proved to be unsatisfactory for use as impregnating solution, in particular for impregnating insulation or building materials, due to either flocculation or excessively high viscosity. The fire behavior of the building or insulating materials treated with the solutions was not tested.

Example 5: Preparation of a Solution Composed of Acid Whey, Water Glass, Saponin, and Water An aqueous solution was prepared from 100 g acid whey dissolved in 250 mL water. In addition, 500 mL water glass dissolved in water and 20 mL saponin were provided and dissolved in 350 mL water. The resulting aqueous solution was slightly sticky, which was attributed to the high percentage of sodium water glass. The aqueous solution showed no flocculation, and was suitable for the treatment of insulating materials. Due to the sticky consistency of the solution, however, the insulating material particles tended toward clumping and sticking, for which reason not very satisfactory distribution of the treated insulating materials, for example in a building or building interspace, was possible. In a combustion test the insulating material treated with the solution showed satisfactory combustion behavior, i.e., little fire evolution and early self-extinguishing of the flame.

Example 6: Preparation of an Aqueous Solution Composed of Acid Whey, Lactose, and Water Glass with the Optional Addition of Saponin Another test mixture was prepared from 100 g acid whey powder dissolved in 250 mL water, 100 g lactose dissolved in water, and 500 mL sodium water glass dissolved in water. A very sticky aqueous solution was thus obtained which was suited in particular for treating solid materials or for reinforcing building materials or other materials, for example solid materials or panels made from fibers or chips. In addition, the building and insulating materials treated with the aqueous solution showed fire behavior comparable to that determined in Example 5. Modifying the solution by adding 10 mL saponin resulted in an aqueous solution which may be used, for example, for paints or the like.

Example 7: Preparation of an Aqueous Solution Composed of Lactose, Acid Whey, Saponin, and Sodium Water Glass An aqueous solution was prepared from 100 g lactose dissolved in water, 50 g acid whey powder dissolved in water, and 20 mL highly diluted saponin. The substances were dissolved separately in water and then combined in one vessel. Sodium water glass dissolved in water was added to the mixture, and the entire mixture was homogenized by stirring.

The aqueous solution prepared in Example 7 showed no clumping or flocculation, and had little or no stickiness. The aqueous solution prepared in this way was suitable for spraying or misting, and showed satisfactory impregnation performance with building or insulating materials and comparable materials. An insulating material based on particle board impregnated with the solution was used for combustion tests.

Example 8: Fire Test According to DIN ISO 9239-1 or DIN 4102 T14 and the Test Specification for Bulk Materials According to VKF, Using Untreated Wood Insulation Chips Precompressed untreated raw wood chips were introduced in a 1:2 ratio into a radiant panel combustibility test apparatus heated to 140 to 160°. The precompressed material introduced into the provided test chamber was acted on by a line burner. A discharge opening likewise provided in the test chamber was half opened to ensure an oxygen supply. The fire evolution was checked using markings spaced at 10-cm intervals. After 10 minutes the action of the line burner on the test material was ended, and the further evolution of the fire was monitored.

In the fire test using untreated raw chips, fire evolution of 10 cm was noted after 2.5 minutes. The fire evolution reached 100 cm within 4 minutes and 5 seconds. After 4 minutes and 30 seconds the flame self-extinguished due to the fact that the area was outside the region of the line burner. A sporadic afterglow was observed in the overall area until the end of the test. Intense hot spots appeared up to the area of 40 cm of the fire evolution. In addition, intense smoke generation was observed. The flames burned at the surface to the end of the test setup. The entire thickness of the sample was burned through in the area up to approximately 40 cm. After the burnthrough at the surface, a further hot spot was identified at 35 cm of the fire evolution, which did not extinguish until after 9.35 min.

Example 9: Combustion Test According to DIN ISO 9239-1 or DIN 4102 T14 and the Test Specification for Bulk Materials According to VKF, Using Wood Insulation Chips Treated with a Whey-soda Mixture In the test setup as described in Example 8, wood insulation chips treated with a whey-soda mixture were used instead of untreated wood insulation chips. After the test apparatus was heated and the compressed insulation chips were acted on, here as well the fire evolution was monitored. Overall, the flame extinguished earlier. Only in the starting area was an afterglow discernible after switching off the burner, and no hot spots appeared. Intense smoke generation was observed. Surface combustion occurred up to the end of the sample, and no flame spots were apparent on the surface. The sample was burned through up to approximately 30 cm of the fire evolution. After approximately 30 cm of the fire evolution, the chips were burned only at the surface. Overall, the impregnation with the whey-soda mixture showed a significant improvement in the combustion behavior compared to the untreated raw chips, in particular with regard to the formation of hot spots.

Example 10: Combustion Test According to DIN ISO 9239-1 or DIN 4102 T14 and the Test Specification for Bulk Materials According to VKF, Using Wood Insulation Chips Treated with the Aqueous Solution According to the Present Invention Insulating material, in the present case wood chips which had already been used in the combustion tests described in Examples 8 and 9, were impregnated with the aqueous solution described in Example 7. For the impregnation, the chips were sprayed with the aqueous solution according to the invention in an impregnation station. Complete penetration with the impregnating agent was ensured by circulating the chips in the impregnation station. After drying, the wood chips were removed from the impregnation station and placed in the test chamber. Compression using a 1:2 compression factor was carried out beforehand as in the examples described above. After the test chamber was heated to 140 to 160° C., the compressed chips were acted on by the flame. The fire evolution ended after 20 cm, and after 2 minutes and 27 seconds of combustion. Self-extinguishing of the flames outside the line burner or the irradiation area occurred after 2 minutes and 45 seconds. The insulating material treated with the aqueous solution according to the invention showed only moderate smoke generation during combustion. Uniform combustion over the entire length of the test system was not ascertainable; instead, an erratic flame formed which extinguished after approximately 24 cm of the fire evolution. A hot spot was identified in the area in which the flame was extinguished. Overall, the insulating material treated with the aqueous solution according to the invention showed significantly improved combustion behavior and early self-extinguishing of the flame. The fire behavior is attributed to the improved impregnation of the wood chips and the overall improved combustion behavior which is thus achievable. The wood chips which were impregnated over the entire surface exhibited a carbon layer on their surface, so that oxygen was excluded from the insulating material, resulting in early, automatic extinguishing of the flame after the flame treatment ended. The formation of the carbon layer is facilitated by the substances lactose and acid whey which are provided in the aqueous solution. In addition, the sodium water glass has an additional flame-retardant effect. The wetting and impregnation of the chips, even in the interior of the chip or wood structure, is modified and improved by the surface-active substance, which is saponin in the exemplary embodiment.

Thus, by use of the aqueous solution according to the invention, the overall combustion behavior may be improved, and early extinguishing of the flame may be achieved. The insulating materials treated with the aqueous solution according to the invention are therefore particularly suitable for use in wooden buildings, and significantly improve the fire protection of such buildings.

The present filing of claims with the patent application and subsequent filing of claims are without prejudice to seeking further protection.

If upon closer examination, in particular also of the relevant prior art, it is shown that one feature or another is advantageous for the objective of the invention but not crucially important, it is understood that a wording is sought which no longer has such a feature, in particular in the main claim. Such a subcombination is also encompassed by the disclosure of the present patent application.

It is further noted that the forms and variants of the invention described in the various embodiments and shown in the figures may be arbitrarily combined with one another. In this regard, individual or multiple features may be arbitrarily replaced with one another. These feature combinations are likewise disclosed herein.

The back-references stated in the dependent claims refer to the further embodiment of the subject matter of the main claim through the features of the respective subclaim. However, this is not to be construed as forgoing the seeking of independent, objective protection for the features of the back-referenced subclaims.

Features which have been disclosed only in the description, or also individual features of claims which include a plurality of features, may be incorporated at any time into the independent claim or claims as having importance essential to the invention for delimitation from the prior art, even if such features have been mentioned in conjunction with other features, or achieve particularly advantageous results in conjunction with other features.

The invention claimed is:

1. An aqueous solution containing:
   a) between 0.1% and 5% by volume of a whey selected from the group comprising: sweet whey, acid whey, or combinations thereof,
   b) between 10% and 85% by volume of water glass selected from the group comprising: sodium water glass, potassium water glass, or combinations thereof,
   c) a solvent containing water,
   d) between 0.001% to 5% by volume of at least one first modifying agent, the at least one first modifying agent being selected from the group comprising: surface-active substances, natural surfactants, synthetic surfactants, anionic surfactants, cationic surfactants, amphoteric surfactants, sugar surfactants, alkyl polyglycosides, soaps, emulsifiers, saponins, saponins obtained from Sapindus mukorossi, saponins obtained from Quillaja saponaria or combinations thereof, and
   e) between 5% to 50% of at least one second modifying agent, the at least one second modifying agent selected from the group comprising: saccharides, alditols, carboxylic acids and their salts and esters, polyhydroxycarboxylic acids and their salts and esters, sugar acid, sugar esters, binders, cellulose, natural wax, synthetic wax, plant wax, mineral wax, stearin, paraffin, natural resin, synthetic resin, natural oil, synthetic oil, chemically modified natural wax, chemically modified synthetic wax, natural wax that is saponified or emulsified in water, synthetic wax that is saponified or emulsified in water, chemically modified natural resin, chemically modified synthetic resin, natural resin that is saponified or emulsified in water, synthetic resin that saponified or emulsified in water, chemically modified natural oil, chemically modified synthetic oil, natural oil that is saponified or emulsified in water, synthetic oil that is saponified or emulsified in water, beer, casein, a thickening agent, talc, chalk, sawdust, sand, fine sand, quartz sand, pigments, natural rodenticide, synthetic rodenticide, insecticide, or fungicide.

2. The aqueous solution according to claim 1, wherein the aqueous solution is used as a flame retardant impregnating or coating agent for a building material which is based on lignocellulose, wherein the building material comprises at least one of solid wood or natural fiberboard, the natural fiberboard being made of at least one material selected from the group comprising: compressed wood fibers, flax fibers, cereal fibers, coconut fibers, sisal fibers, reed fibers, hemp fibers, palm fibers, fiber mixtures, panels made of wool, wood wool panels, laminated wood, glued wood, MDF, HDF, OSB, particle board, plywood, or veneer plywood; or for an insulating material, the insulating material being selected from the group comprising: lignocellulose-based insulating material, r wood, wood chips, or wood fibers, flax fibers, cereal fibers, coconut fibers, sisal fibers, reed fibers, hemp fibers, palm fibers, or fiber mixtures, grass, cereals, cellulose, cellulose fibers, and recycled paper, animal insulating material, wool or combinations thereof; the aqueous solution being present as a sprayable or atomizable solution, the sprayed or atomizable solution having droplets with an average diameter of between 10 and 50 μm, wherein the proportion of water glass in the aqueous solution is between 10 and 70% by volume, wherein the aqueous solution has a viscosity between 1 and 3 mPa·s at room temperature; or as a flame-retardant, spreadable application solution for a building material, selected from the group comprising: solid wood, natural fiberboard, natural fiberboard made of compressed wood fibers, flax fibers, cereal fibers, coconut fibers, sisal fibers, reed fibers, hemp fibers, palm fibers, fiber mixtures, or panels made of wool, wood wool panels, laminated wood, glued wood, MDF, HDF, OSB, particle board, plywood, veneer plywood, at least one additional modifying agent being selected from the group comprising: binders, cellulose, natural wax or synthetic wax, plant wax, mineral wax, stearin or paraffin, natural resin or synthetic resin, natural oil or synthetic oil, natural wax or synthetic wax which is chemically modified, natural wax or synthetic wax which is saponified or emulsified in water, natural resin or synthetic resin which is chemically modified, natural resin or synthetic resin which is saponified or emulsified in water, natural oil or synthetic oil which is chemically modified, natural oil or synthetic oil which is saponified or emulsified in water; beer; casein; thickening agent, talc, chalk, sawdust, sand, fine sand or quartz sand, the proportion of the modifying agent in the aqueous solution being between 0 and 50% by volume, and/or the proportion of the at least one surface-active substance, being between 0 and 0.05% by volume, the aqueous solution preferably having a viscosity between 2 and $10^{14}$ mPa·s, at room temperature; or as a flame-retardant adhesive or binder for a building material made of compressed lignocellulose fibers and/or animal fibers, wool, a building material selected from the group comprising: wood chips, wood fibers, wood pulp, flax fibers, cereal fibers, coconut fibers, sisal fibers, reed fibers, hemp fibers, palm fibers, or fiber mixtures, grass, cereals, cellulose, cellulose fibers, and recycled paper or combinations thereof, the proportion of water glass being in particular between 10 and 80% by volume, and/or the proportion of the at least one surface-active substance, being between 0 and 0.05% by volume.

3. The aqueous solution according to claim 1, wherein the aqueous solution is used as a preventive fire protection agent.

4. The aqueous solution according to claim 3, wherein the aqueous solution is present as a sprayable or atomizable solution, the sprayed or atomized solution having droplets with an average diameter of between 10 and 50 μm, and/or the proportion of water glass in the aqueous solution being between 10 and 70% by volume, and/or the aqueous solution having a viscosity between 1 and 3 mPa·s at room temperature.

5. The aqueous solution according claim 1, wherein the aqueous solution is used as a casting or sealing compound.

6. The aqueous solution according to claim 5, wherein the casting or sealing compound is designed as a sprayable, pourable, or flowable compound, comprising at least one of a flame-resistant or air-tight seal being provided against penetration into buildings, walls, or ceilings, and/or at least one additional modifying agent being selected from the group comprising: binders, cellulose, natural or synthetic wax, plant wax, mineral wax, stearin or paraffin, natural or synthetic resin, natural oil or synthetic oil, natural wax or synthetic wax which is chemically modified, natural wax or synthetic wax which is saponified or emulsified in water, natural resin or synthetic resin which is chemically modified, natural resin or synthetic resin which is saponified or emulsified in water, natural oil or synthetic oil which is chemically fortified, natural oil or synthetic oil which is saponified or emulsified in water; a thickening agent, talc, chalk, sawdust, sand, fine sand or quartz sand.

7. A building material having impregnation or wetting based on the aqueous solution according to claim 1, the building material being selected from the group comprising: solid wood, natural fiberboard, natural fiberboard made of compressed wood fibers, flax fibers, cereal fibers, coconut fibers, sisal fibers, reed fibers, hemp fibers, palm fibers, fiber mixtures, or panels made of wool, wood wool panels, laminated wood, glued wood, MDF, HDF, OSB, particle board, plywood, or veneer plywood, and/or the impregnation or wetting penetrating or being introduced into the surface of the building material or the substances or fibers which form the building material, the impregnation or wetting being appliable or introducible onto and/or into the surface by spraying, atomizing, spreading, or pressure impregnation.

8. An insulating material having impregnation or wetting based on the aqueous solution according to one of claim 1, the insulating material being selected from the group comprising: lignocellulose-based insulating material, wood, wood chips, or wood fibers, flax fibers, cereal fibers, coconut fibers, sisal fibers, reed fibers, hemp fibers, palm fibers, or fiber mixtures, grass, cereals, cellulose, cellulose fibers, and recycled paper, animal insulating material, wool or combinations thereof, and/or the impregnation or wetting penetrating or being introduced into the surface of the insulating material or the substances or fibers which form the insulating material, the impregnation or wetting being appliable or introducible onto and/or into the surface by spraying, atomizing, spreading, or pressure impregnation, the relative humidity of the impregnated insulating material corresponding to that of the non-impregnated insulating material.

9. A building material made of the aqueous solution according to claim 1 as a flame-retardant adhesive or binder containing lignocellulose fibers and/or animal fibers, the lignocellulose fibers being selected from the group comprising: wood chips, wood fibers, wood pulp, flax fibers, cereal fibers, coconut fibers, sisal fibers, reed fibers, hemp fibers, palm fibers, or fiber mixtures, grass, cereals, cellulose, cellulose fibers, and recycled paper, or combinations thereof, and/or the proportion of the adhesive or binder, based on the total mass of the building material, being between 0.5 and 50%.

10. A building material having a paint made from the aqueous solution according to claim 1.

11. The building material according to claim 10, wherein the building material is selected from the group comprising: solid wood, wood boards, wood panels, wood sheets, wood veneers, wood beams, natural fiberboard, natural fiberboard made of compressed wood fibers, flax fibers, cereal fibers, coconut fibers, sisal fibers, reed fibers, hemp fibers, palm fibers, fiber mixtures, or panels made of wool, wood wool panels, laminated wood, laminated wood panels, glued wood, glued wood panels, glue-laminate beams, MDF, HDF, OSB, particle board, plywood, veneer plywood, veneer, or veneer panels, and/or the paint is colorless or semitransparent or contains a paint pigment admixture, and/or seals the surface of building material in a water-tight manner.

12. The aqueous solution of claim 1, wherein the water glass comprises sodium water glass 37/40 Bé.

13. The aqueous solution according to claim 1, wherein the saccharides comprises at least one of: monosaccharides, disaccharides, trisaccharides, polysaccharides, sucrose, lactose, lactulose, maltose, or trehalose.

14. An aqueous solution consisting of:
a) whey
b) sodium water glass 37/40 Be,
c) at least one solvent,
d) at least one first modifying agent comprising saponin; and
e) at least one second modifying agent.

15. An aqueous solution, comprising:
a) whey, comprising at least one of sweet whey, acid whey, or a combination thereof;
b) water glass, comprising at least one of sodium water glass, potassium water glass, or combinations thereof;
c) at least one solvent; and
d) at least one first modifying agent comprising saponin.

* * * * *